United States Patent
Benner

(10) Patent No.: US 7,473,886 B2
(45) Date of Patent: Jan. 6, 2009

(54) POSITION-MEASURING DEVICE

(75) Inventor: Ulrich Benner, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 86 days.

(21) Appl. No.: 11/801,057

(22) Filed: May 7, 2007

(65) Prior Publication Data

US 2007/0262250 A1 Nov. 15, 2007

(30) Foreign Application Priority Data

May 5, 2006 (DE) ........................ 10 2006 021 017

(51) Int. Cl.
*G01D 5/34* (2006.01)

(52) U.S. Cl. ................................. 250/231.13

(58) Field of Classification Search ................................
250/231.13–231.18, 237 G, 559.29; 356/499, 356/614–622; 33/706–707, 1 PT
See application file for complete search history.

(56) References Cited

U.S. PATENT DOCUMENTS

| 5,317,149 | A  | * | 5/1994 | Uebbing et al. | ........ | 250/231.14 |
| 6,723,980 | B2 | * | 4/2004 | Lee | ........................ | 250/231.16 |
| 6,741,335 | B2 |   | 5/2004 | Kinrot et al. | | |
| 7,057,160 | B2 | * | 6/2006 | Ito | ........................ | 250/231.13 |
| 2003/0010906 | A1 | * | 1/2003 | Lee | ........................ | 250/231.13 |
| 2004/0155178 | A1 |   | 8/2004 | Ito | | |
| 2005/0023450 | A1 |   | 2/2005 | Ito | | |
| 2007/0120048 | A1 | * | 5/2007 | Lum et al. | .............. | 250/231.13 |
| 2007/0262250 | A1 | * | 11/2007 | Benner | .................... | 250/231.13 |

OTHER PUBLICATIONS

Search Report, European Patent Application No. 07007787.0, dated Aug. 3, 2007 (translated).

* cited by examiner

*Primary Examiner*—John R Lee
(74) *Attorney, Agent, or Firm*—Kenyon & Kenyon LLP

(57) ABSTRACT

In a position-measuring device for acquiring the relative position of a scanning unit and a reflection measuring graduation movable relative thereto in at least one measuring direction, the scanning unit includes a light source and a detector arrangement in a detection plane. In a first variant of the scanning unit, at least one optical reflector element is positioned in the scanning beam path which has an optical effect on the scanning beam path to the effect that the distance between a virtual light source and the reflection measuring graduation on one hand, and the distance between the reflection measuring graduation and the detector arrangement/detection plane on the other hand are identical. In a second variant, in the scanning unit at least one optical transmission element is disposed in the scanning beam path which has an optical effect on the scanning beam path to the effect that the distance between the light source and the reflection measuring graduation on one hand, and the distance between the reflection measuring graduation and a detector arrangement in a virtual detection plane on the other hand are identical.

25 Claims, 7 Drawing Sheets

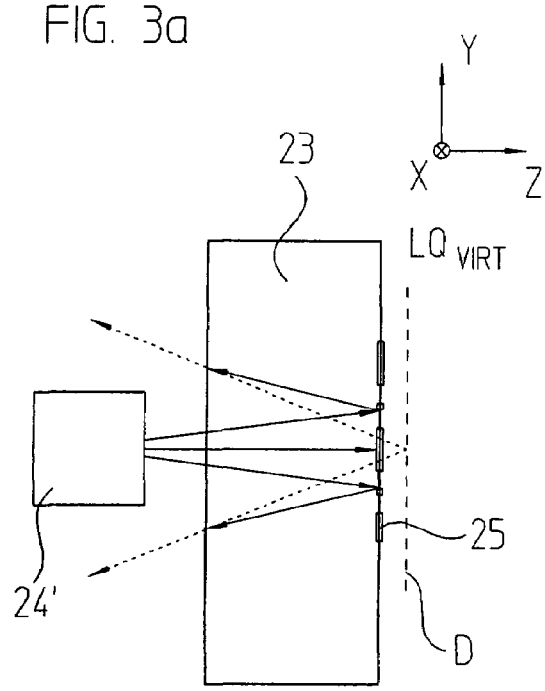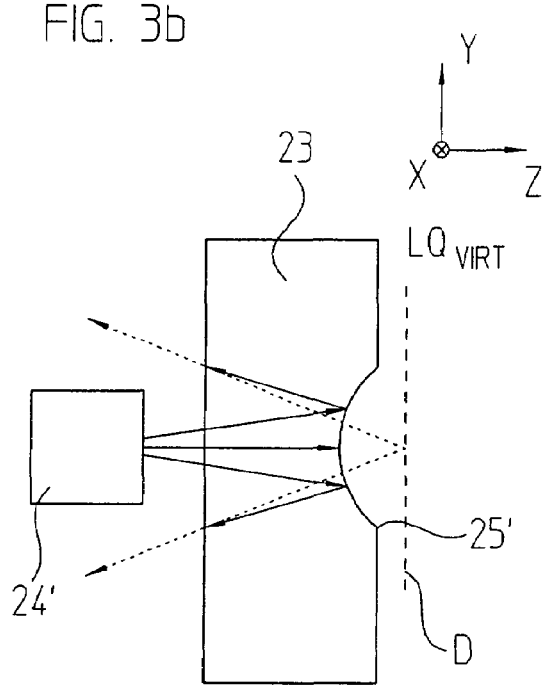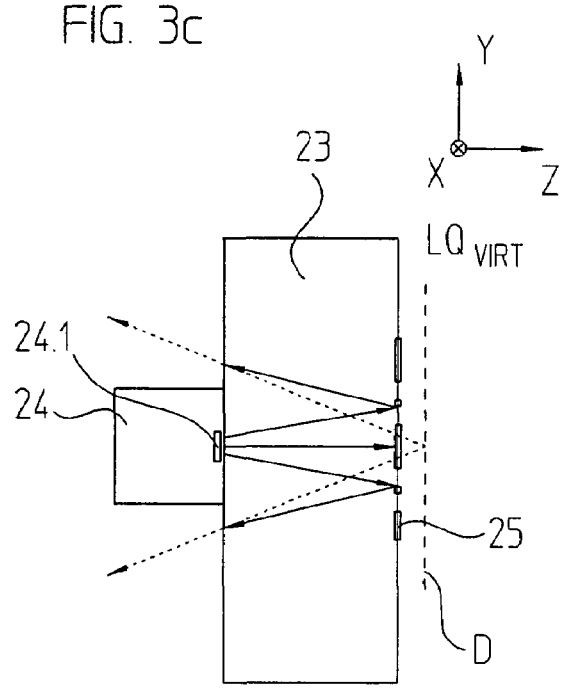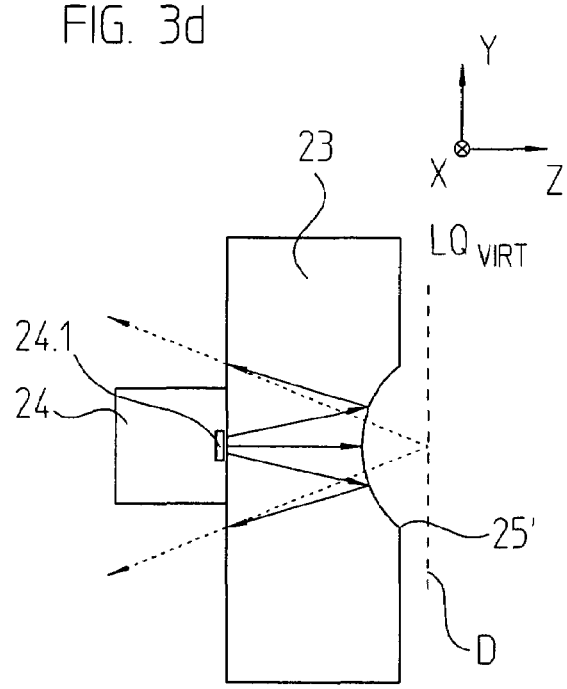

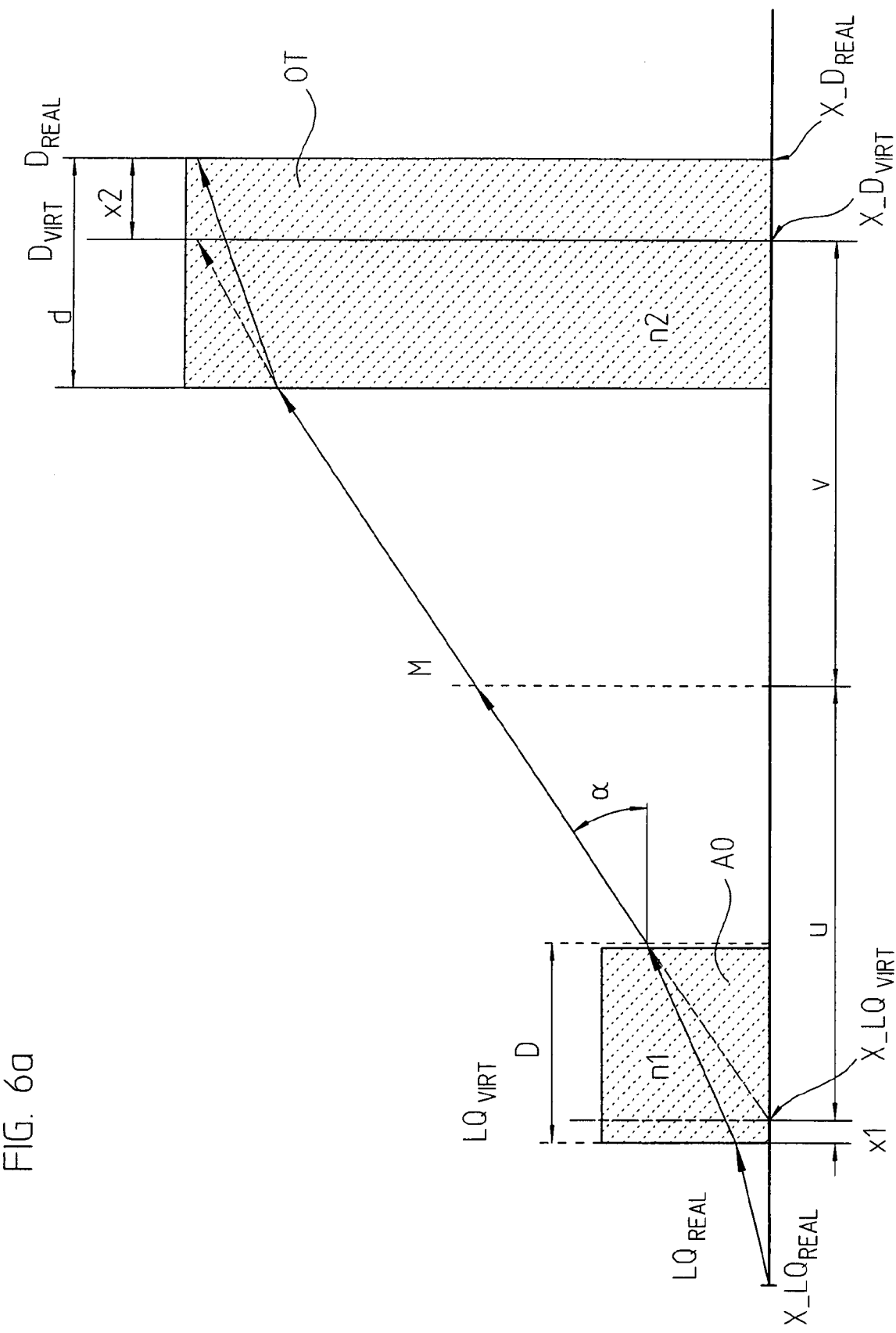

POSITION-MEASURING DEVICE

CROSS-REFERENCE TO RELATED APPLICATIONS

The present application claims priority to Application No. 10 2006 021 017.4, filed in the Federal Republic of Germany on May 5, 2006, which is expressly incorporated herein in its entirety by reference thereto.

FIELD OF THE INVENTION

The present invention relates to position-measuring devices.

BACKGROUND INFORMATION

A position-measuring device of this kind is described, for example, in U.S. Patent Application Publication No. 2005/0023450. In addition to a measuring graduation, e.g., taking the form of a linear reflection measuring graduation, the device includes a scanning unit displaceable relative thereto in at least one measuring direction. Provided on the side of the scanning unit are a light source as well as a detector arrangement in the form of a periodic detector array.

In the event of the relative movement of the scanning unit and measuring graduation, there results in the detection plane a fringe pattern, modulated as a function of the displacement, which is detected by the detector arrangement and converted into scanning signals able to be further processed. In this context, because the detector arrangement is arranged in the form of a periodic detector array, a plurality of out-of-phase scanning signals are generated in a conventional manner.

In such systems, generally, the aim is for the light source used and the detector arrangement used to be arranged to the greatest extent possible in the same plane. This may be achieved, for example, by disposing the light source in a central cavity in a carrier substrate, the cavity being surrounded by the detector elements of the detector array. However, this is associated with significant manufacturing expenditure. Thus, the carrier substrate must be formed with a suitable cavity. In addition, the contacting of the light source in the cavity is relatively difficult.

With regard to such systems, U.S. Patent Publication No. 2004/0155178 describes in FIGS. 13 and 14 that by arranging transmissive optical elements between the light source and measuring graduation, it is possible to precisely adjust the geometric-spatial position of a virtual point light source. However, in so doing, the transmissive optical elements displace the position of the virtual point light source markedly before the detection plane. That is to say, the above-mentioned requirement with respect to the arrangement of the light source in the plane of the detector arrangement cannot be satisfied by the measures proposed. A change, dependent on the scanning distance, in the periodicity of the fringe pattern generated in the detection plane results as an unwanted consequence. However, the aim is for a constant fringe-pattern period in the detection plane, even if the scanning distance possibly fluctuates.

SUMMARY

Example embodiments of the present invention provide a position-measuring device of the type mentioned above, in which easy production of the scanning unit may be ensured. An aspect of example embodiments of the present invention is to provide for reliable generation of displacement-dependent scanning signals, e.g., an independence from possible fluctuations of the scanning distance, that is, the distance between the scanning unit and the measuring graduation.

At least one reflector element may be disposed in the scanning beam path in the scanning unit. The reflector element has an optical effect on the scanning beam path to the effect that the distance between a virtual light source and the reflection measuring graduation on one hand, and the distance between the reflection measuring graduation and the detection plane on the other hand, are identical, which means the light source is placed virtually in the detection plane.

Therefore, it is possible to adhere to the central requirement for identical distances between the (virtual) light source and the reflection measuring graduation on one hand, and the reflection measuring graduation and the detector arrangement or the detector plane on the other hand, for the present scanning principle. By the suitable positioning of the reflector element between the real light source and the reflection measuring graduation, it is possible to precisely adjust the distance between the light source and the reflection measuring graduation. In this manner, a constant fringe-pattern periodicity in the detection plane may be ensured, even given possibly fluctuating scanning distances. In addition, it is possible to avoid the above-mentioned production problems associated with the otherwise necessary placement of the light source in a suitable cavity. Thus, more varied possibilities exist for placement of the light source in the scanning unit.

The reflector element may be arranged between the light source and the reflection measuring graduation.

It is possible to form the reflector element as a refractive optical element or as a diffractive optical element.

The scanning unit may include a transparent carrier substrate, the light source being disposed on its first side (upper side) facing the reflection measuring graduation, and the reflector element being disposed on its second side (lower side) facing away from the reflection measuring graduation.

The radiation-emitting area of the light source may be disposed in the direction of the first side of the carrier substrate, and the light source emits radiation in the direction of the second side of the carrier substrate.

The reflector element may take the form of an optical component integrated into the second side of the carrier substrate.

The carrier substrate with the light source and the reflector element may be positioned over a detector unit having at least one detector arrangement, the detector unit being placed on a support board in the scanning unit.

The carrier substrate is able to take up a smaller area than the detector unit and may be arranged in a central partial area of the detector unit without the detector arrangements being completely covered, so that in regions not covered by the carrier substrate, the detector unit is electroconductively connected via bonding wires to conductor tracks in the support board.

Moreover, the light source on the carrier substrate may be electroconductively connected via bonding wires to conductor tracks in the detector unit.

It is also possible for the carrier substrate to at least partially cover the at least one detector arrangement on the detector unit, contacting conductor tracks being situated between the second side of the carrier substrate and the detector arrangement for the electrical contacting of the detector arrangement.

The light source on the carrier substrate may be electroconductively connected via contacting conductor tracks on the carrier substrate to conductor tracks in the detector unit.

At least one optical transmission element may be arranged in the scanning beam path, which has an optical effect on the scanning beam path to the effect that the distance between the light source and the reflection measuring graduation on one hand, and the distance between the reflection measuring graduation and a detector arrangement in a virtual detection plane on the other hand, are identical, so that in the event of the relative movement of the scanning unit and the reflection measuring graduation, a fringe pattern, modulated as a function of the displacement, results in the virtual detection plane.

Thus, that the scanned fringe pattern comes to lie in the virtual detection plane may be ensured. Depending on the scanning configuration at hand, this may be necessary in addition to the measures of described above or else may be sufficient as a sole measure in order to provide the desired independence of the scanning from the scanning distance.

The optical transmission element may be situated between the reflection measuring graduation and the detector arrangement in the scanning beam path.

The optical transmission element may be arranged as a refractive optical element, e.g., as a plane-parallel glass plate having a defined thickness.

The scanning unit may include a support board on which a detector unit having at least one detector arrangement is situated, the optical transmission element being disposed above the detector arrangement.

Further, the optical transmission element may be provided with optical elements which provide that light falls only perpendicularly onto the detector arrangement.

The light source may take the form of a point light source.

The scanning unit may include at least two detector arrangements, of which a first detector arrangement is suited for detecting a displacement-dependent incremental signal, and a second detector arrangement is suited for detecting an absolute-position signal.

Moreover, the detector arrangement may take the form of a detector array made up of individual detector elements positioned adjacent to one another in the measuring direction.

According to an example embodiment of the present invention, a position-measuring device includes: a reflection measuring graduation; and a scanning unit, the scanning unit and the reflection measuring graduation movable relative to each other in at least one measuring direction. The scanning unit includes: a light source; a detector arrangement in a detection plane; and at least one reflector element arranged in a scanning beam path, the reflector element configured to have an optical effect on the scanning beam path so that a distance between a virtual light source and the reflection measuring graduation and a distance between the reflection measuring graduation and the detection plane are equal so that the light source is placed virtually in the detection plane.

The reflector element may be positioned between the light source and the reflection measuring graduation.

The reflector element may be arranged as a refractive optical element.

The reflector element may be arranged as a diffractive optical element.

The scanning unit may include a transparent carrier substrate, the light source may be located on a first side of the carrier substrate facing the reflection measuring graduation, and the reflector element may be located on a second side of the carrier substrate facing away from the reflection measuring graduation.

A radiation-emitting area of the light source may be disposed in a direction of the first side of the carrier substrate, and the light source may be configured to emit radiation in a direction of the second side of the carrier substrate.

The reflector element may be arranged as an optical component integrated into the second side of the carrier substrate.

The carrier substrate may be positioned above a detector unit having at least one detector arrangement, and the detector unit may be arranged on a support board in the scanning unit.

The carrier substrate may have a smaller area than the detector unit and may be arranged in a central partial area of the detector unit without the detector arrangements being completely covered, and the detector unit, in regions not covered by the carrier substrate, may be electroconductively connected via bonding wires to conductor tracks in the support board.

The light source on the carrier substrate may be electroconductively connected via bonding wires to conductor tracks in the detector unit.

The carrier substrate may partially cover the at least one detector arrangement on the detector unit, and contacting conductor tracks may be arranged between the second side of the carrier substrate and the detector arrangement for electrical contact of the detector arrangement.

The light source on the carrier substrate may be electroconductively connected via contacting conductor tracks on the carrier substrate to conductor tracks in the detector unit.

The light source may be arranged as a point light source.

The scanning unit may include at least two detector arrangements, of which a first detector arrangement may be configured to detect a displacement-dependent incremental signal, and a second detector arrangement may be configured to detect an absolute-position signal.

The detector arrangement may be arranged as a detector array including individual detector elements disposed adjacent to one another in the measuring direction.

According to an example embodiment of the present invention, a position-measuring device includes: a reflection measuring graduation; and a scanning unit, the scanning unit and the reflection measuring graduation movable relative each other in at least one measuring direction. The scanning unit includes: a light source; a detector arrangement in a detection plane; and at least one optical transmission element arranged in a scanning beam path, the optical transmission element configured to have an optical effect on the scanning beam path so that a distance between the light source and the reflection measuring graduation and a distance between the reflection measuring graduation and a detector arrangement in a virtual detection plane are equal, so that, for relative movement between the scanning unit and the reflection measuring graduation, a fringe pattern, modulated as a function of the movement, results in the virtual detection plane.

The optical transmission element may be arranged between the reflection measuring graduation and the detector arrangement in the scanning beam path.

The optical transmission element may be arranged as a refractive optical element.

The optical transmission element may be arranged as a plane-parallel glass plate having a defined thickness.

The scanning unit may include a support board on which a detector unit having at least one detector arrangement is arranged, and the optical transmission element may be arranged above the detector arrangement.

The optical transmission element may include optical elements to provide that light falls only perpendicularly onto the detector arrangement.

The light source may be arranged as a point light source.

The scanning unit may include at least two detector arrangements, of which a first detector arrangement may be configured to detect a displacement-dependent incremental signal, and a second detector arrangement may be configured to detect an absolute-position signal.

The detector arrangement may be arranged as a detector array including individual detector elements disposed adjacent to one another in the measuring direction.

According to an example embodiment of the present invention, a position-measuring device includes: a reflection measuring graduation; and a scanning unit, the scanning unit and the reflection measuring graduation movable relative to each other in at least one measuring direction. The scanning unit includes: a light source; a detector arrangement in a detection plane; and one of: (a) at least one reflector element arranged in a scanning beam path, the reflector element configured to have an optical effect on the scanning beam path so that a distance between a virtual light source and the reflection measuring graduation and a distance between the reflection measuring graduation and the detection plane are equal so that the light source is placed virtually in the detection plane; and (b) at least one optical transmission element arranged in the scanning beam path, the optical transmission element configured to have an optical effect on the scanning beam path so that a distance between the light source and the reflection measuring graduation and a distance between the reflection measuring graduation and a detector arrangement in a virtual detection plane are equal, so that, for relative movement between the scanning unit and the reflection measuring graduation, a fringe pattern, modulated as a function of the movement, results in the virtual detection plane.

Further features and aspects of example embodiments of the present invention are described in more detail below with reference to the appended Figures.

BRIEF DESCRIPTION OF THE DRAWINGS

FIG. 1b is a top view of the scanning unit of the position-measuring device illustrated in FIG. 1a.

FIGS. 3a to 3d illustrate alternative arrangements of the optical reflector element in the scanning unit of a position-measuring device.

FIG. 4b is a top view of the scanning unit of the position-measuring device illustrated in FIG. 4a.

FIG. 5b is a top view of the scanning unit of the position-measuring device illustrated in FIG. 5a.

FIG. 6a is a schematic representation of the unfolded scanning beam path for clarifying certain geometric variables in the position-measuring device.

FIG. 6b is an enlarged view of a portion of FIG. 6a.

DETAILED DESCRIPTION

Figure 1A:
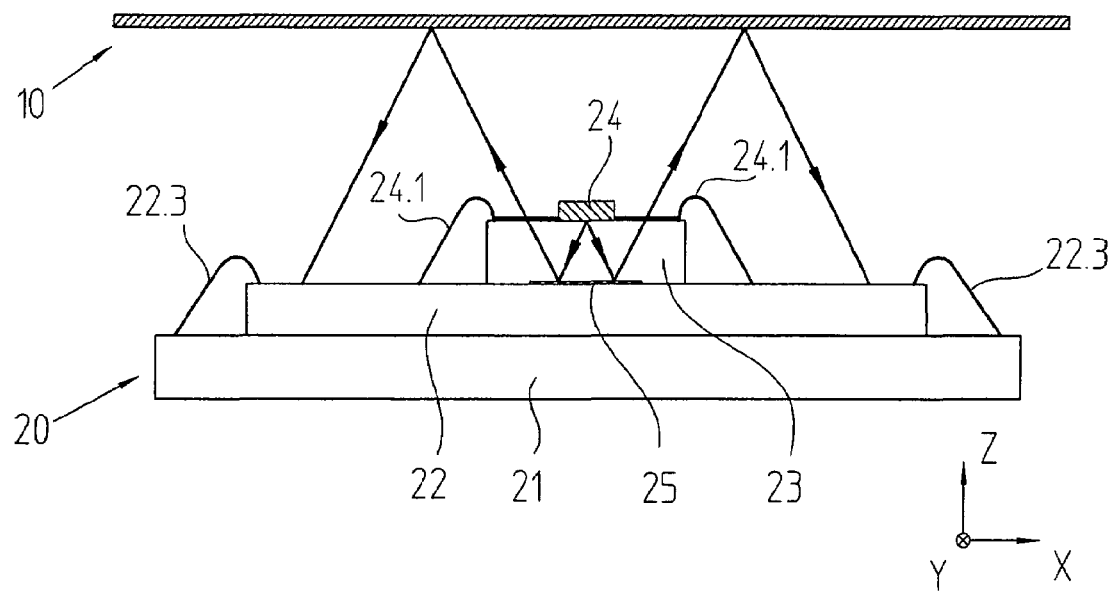
FIG. 1a is a schematic side view of a position-measuring device according to an example embodiment of the present invention.
Figure 1B:
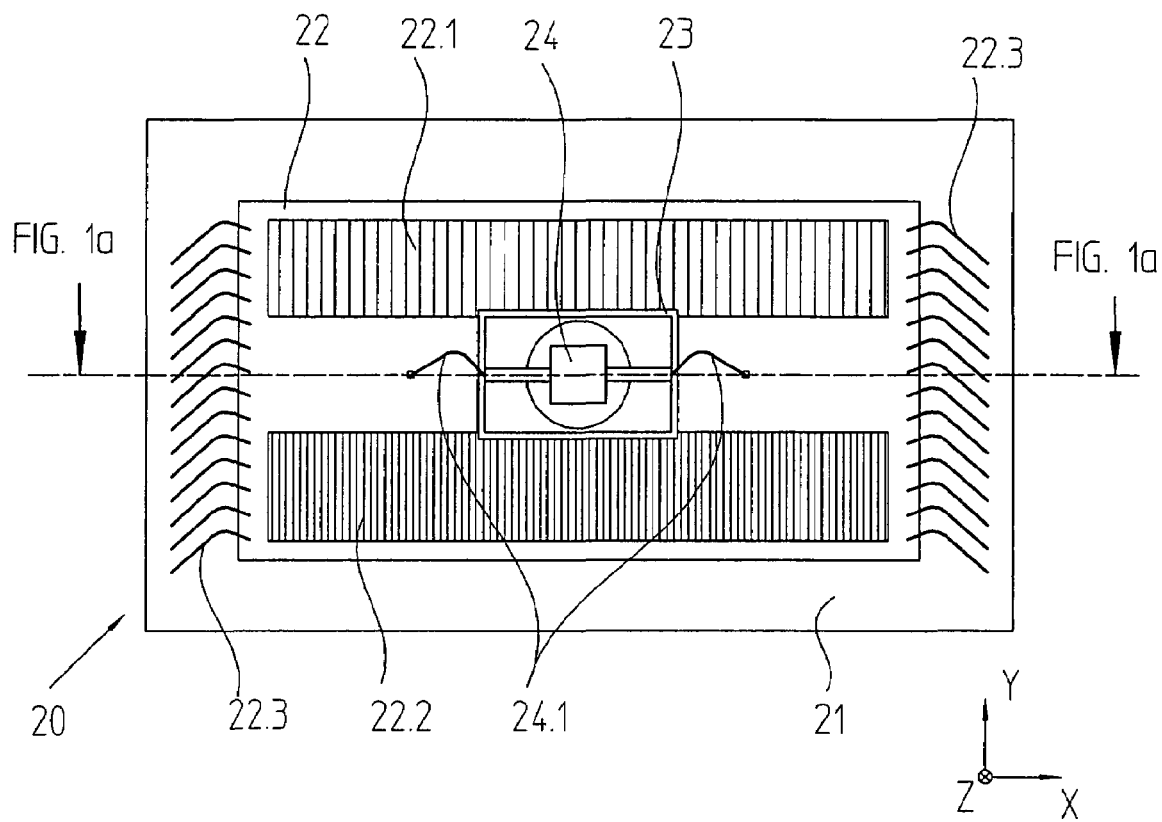

A position-measuring device according to an example embodiment of the present invention is explained with reference to FIGS. 1a and 1b. FIG. 1a is a schematic side view of parts of scanning unit 20 and of reflection measuring graduation 10 including the scanning beam path. FIG. 1b is a top view of scanning unit 20 illustrated in FIG. 1a.

In the example embodiment illustrated, the position-measuring device includes a scanning unit 20 which is arranged in a manner allowing movement relative to a reflection measuring graduation 10 in measuring direction x. For example, reflection measuring graduation 10 and scanning unit 20 are connected to two objects displaceably disposed relative to each other in measuring direction x, for instance, two machine parts movable relative to each other. A downstream control unit is able to suitably control the movement of these machine parts, e.g., in a conventional manner, based on the position-dependent output signals of the position-measuring device.

In the example embodiment illustrated, reflection measuring graduation 10 has a track having a linear incremental graduation, as well as a track parallel thereto, having a pseudo-random coding for the absolute-position detection. Both tracks are situated on a suitable graduated scale carrier, e.g., a steel substrate.

The track having the incremental graduation includes sub-areas disposed periodically in measuring direction x and having different optical reflective properties. The sub-areas extend in the graduation plane perpendicular to measuring direction x, i.e., in the indicated y-direction. The sub-areas of the example embodiment illustrated have different phase-shifting effects on the beams of rays reflected by them. In this example embodiment, reflection measuring graduation 10 takes the form of a so-called reflection phase grating.

The track having the pseudo-random coding includes sub-areas disposed aperiodically in the measuring direction and having different optical reflective properties Only one part of scanning unit 20 is illustrated in the highly schematic representation in FIGS. 1a and 1b. Generally, scanning unit 20 also includes a suitable housing in which its various components are situated. For clarity, only the elements necessary for explaining the example embodiments of the present invention are illustrated.

On the side of scanning unit 20, a detector unit 22 having two detector arrangements 22.1, 22.2 is provided on a support board 21. A first detector arrangement 22.1 is used for scanning a periodic fringe pattern in the detection plane and for generating a plurality of phase-shifted incremental signals. The scanned fringe pattern results from the optical scanning of the incremental graduation on reflection measuring graduation 10. First detector arrangement 22.1 includes, e.g., a conventional, detector array, having a periodic arrangement of individual detector elements or photodiodes in measuring direction x.

A second detector arrangement 22.2 acts, e.g., in a conventional manner, for scanning the pseudo-random coding of the second track projected into the detection plane. The generation of at least one absolute-position signal is possible via second detector arrangement 22.2. For simplicity, the incremental signals and absolute-position signals generated in this manner are denoted hereinafter only as position signals.

Both detector arrangements 22.1, 22.2 are electrically contacted, i.e., electroconductively connected via bonding wires 22.3 to conductor tracks in support board 21. The generated position signals are supplied via the conductor tracks in support board 21 to a downstream control unit for further processing.

Above detector unit 22 having the two detector arrangements 22.1, 22.2, a transparent carrier substrate 23, e.g., in the form of a plate-shaped glass carrier substrate, is disposed on the side of scanning unit 20 in a central partial area of the detector arrangements. In the present example embodiment, this carrier substrate takes up only a smaller part of the total area of the detector arrangement(s) or the surface of detector unit 22, as illustrated, for example, in FIG. 1b. On the upper side of carrier substrate 23, hereinafter denoted as first side of carrier substrate 23, a light source 24 is placed. A so-called point light source, for example, a so-called VCSEL light source, may be provided as the light source. Light source 24 is electrically contacted via further bonding wires 24.1, which are connected on the upper side of carrier substrate 23 to corresponding contacts. These contacts are connected to conductor tracks in detector unit 22 via bonding wires 24.1.

The radiation-emitting area of light source 24 is oriented in the direction of the first side of carrier substrate 23. Light source 24 therefore radiates away from reflection measuring graduation 10 in the direction of the lower side of carrier substrate 23, which hereinafter is referred to as second side of the carrier substrate.

Disposed on the lower side or second side of carrier substrate 23 is an optical reflector element 25 that, in the present example, is formed as a grating structure, i.e., as a diffractive optical element, integrated into carrier substrate 23. Its optical functionality is described in detail below.

As indicated in FIG. 1a, the beams of rays coming from light source 24 are deflected or reflected back by reflector element 25 in the direction of reflection measuring graduation 10, and subsequently pass through carrier substrate 23 again in the reverse direction. The partial beams of rays then arrive at reflection measuring graduation 10, and there in turn are reflected back in the direction of scanning unit 20. On the side of scanning unit 20, the partial beams of rays coming from reflection measuring graduation 10 ultimately arrive at detector arrangements 22.1, 22.2 placed in the detection plane, and there, in the event of the relative movement of scanning unit 20 and reflection measuring graduation 10, generate displacement-dependent position signals. In the case of the incremental signals, a periodic fringe pattern is generated in the detection plane via the scanning beam path described and the interactions of the partial beams of rays with reflection measuring graduation 10 thereby resulting. In the case of the relative movement of scanning unit 20 and reflection measuring graduation 10, this fringe pattern is modulated as a function of the displacement and is converted, e.g., in a conventional manner, via detector arrangement 22.1 into a plurality of phase-shifted incremental signals for further processing.

As indicated above, for the present scanning principle, it is significant for the generation of the incremental signals that light source 24 used is disposed in the detection plane to the greatest extent possible. Only in this case is it possible to provide the insensitivity of the periodic fringe pattern generated in the detection plane to the respective scanning distance. Regarding these relationships, reference is made to the explanation of FIG. 2. Conventionally, either one puts up with such a fluctuation of the fringe-pattern period in the detection plane, or else a central positioning of the light source in a cavity is provided, which is surrounded by the detector arrangement. Within the framework hereof, an alternative possibility for solving this problem is provided by a certain layout of the scanning beam path, and particularly by the provision of reflector element 25 mentioned. Thus, by the integration of reflector element 25 in the scanning beam path, light source 24 is placed virtually in the detection plane, while actually or really, it is arranged at a different location of scanning unit 20, e.g., as apparent, for example, in FIGS. 1a and 1b, on the first side or upper side of carrier substrate 23.

Figure 2:
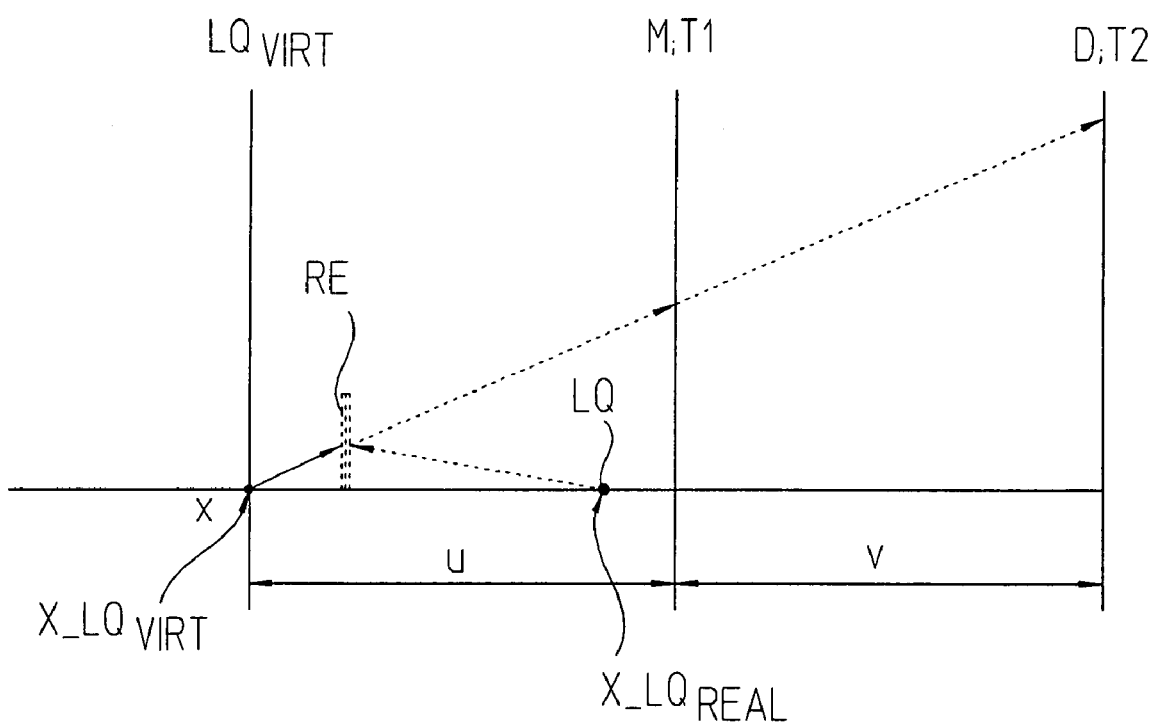
FIG. 2 is a schematic representation of the scanning beam path for clarifying certain geometric variables in the position-measuring device.

The procedure hereof is clarified in greater detail based on the view illustrated in FIG. 2. FIG. 2 illustrates, in schematic form, the unfolded scanning beam path, including several relevant geometric variables.

In this context, in FIG. 2, M denotes the plane having the reflection measuring graduation, D denotes the detection plane, $LQ_{VIRT}$ indicates the position of the virtual light-source plane, RE denotes the reflector element, and LQ denotes the real light source. The variable T1 indicates the graduation period of the scanned measuring graduation, and T2 indicates the graduation period of the periodic fringe pattern resulting in detection plane D. The position of the virtual light source in the scanning beam path along measuring direction x is indicated via the coordinate $x\_LQ_{VIRT}$, while the coordinate $X\_LQ_{REAL}$ indicates the position of the real light source, as clarified in FIGS. 1a and 1b. As illustrated, variable u represents the distance between virtual light-source plane $LQ_{VIRT}$ and measuring-graduation plane M, and variable v represents the distance between measuring-graduation plane M and detection plane D.

In the case of incident-light scanning configurations, the periodicity T2 of the generated fringe pattern in detection plane D is obtained based on familiar geometric considerations according to the following equation (1):

$$T2 = T1*(u+v)/v \qquad (Eq. 1)$$

In the case of fluctuations of u and v possibly resulting in practice, thus, given fluctuations of scanning distance $\Delta uv$ in the incident-light system, a resulting fluctuation $\Delta T2$ in the periodicity of the generated fringe pattern is obtained according to the following equation (2):

$$\Delta T2 = T1*\Delta uv(1-u/v)/v \qquad (Eq. 2),$$

where $\Delta uv$:=variation of the scanning distance.

If the condition u=v is satisfied, then the term (1−u/v) in equation (2) vanishes, that is, periodicity T2 of the fringe pattern in detection plane D remains unchanged, even given possible fluctuations of scanning distance $\Delta uv$, since $\Delta T2=0$ results. For an incident-light system, satisfaction of the condition u=v is synonymous with the placement of the light source in detection plane D.

As follows from FIG. 2, the condition u=v can however also be satisfied in that light source LQ is disposed virtually in plane $LQ_{VIRT}$, but is really placed in position $x\_LQ_{REAL}$. As is apparent from FIG. 2, this is made possible by the use of a reflector element RE at the position indicated. Variable u in the conditions mentioned above may thereby be influenced deliberately in defined manner. Since it is no longer necessary to position actual light source LQ in detection plane D, a number of degrees of freedom result with respect to the arrangement of light source LQ in the scanning unit.

Several possibilities for realizing the reflector element in conjunction with the respective light source are explained below with reference to FIGS. 3a to 3d. FIGS. 3a to 3d illustrate, in highly schematic form, different variants for the arrangement and/or embodiment of the reflector element and the light source in the scanning unit.

FIG. 3a illustrates a variant in which, opposite light source 24', on the second side of carrier substrate 23, reflector element 25 is integrated into this side. In this example, reflector element 25 is formed by a diffractive grating structure. For example, such a grating structure may include multi-stage phase gratings having a blazed grating structure or ideal blazed grating structures. Also indicated by a dashed line in FIG. 3a is the position of the virtual light source in plane $LQ_{VIRT}$, which coincides with detector plane D, as desired.

An alternative arrangement of a suitable reflector element is illustrated in FIG. 3b. Only the differences with respect to the previous examples are explained below. Otherwise the same reference numerals are used for functionally identical elements described above.

In FIG. 3b, reflector element 25' on the second side of carrier substrate 23, situated opposite light source 24', is arranged as a refractive optical element having the desired optical effect. For example, a mirror may be formed by a suitable coating at this location of carrier substrate 23, the mirror having an appropriate optical reflective effect on the beams of rays falling on it. The suitable reflector contour at this location may be aspherical.

In contrast to the previous example, in the examples illustrated in FIGS. 3a and 3b, light source 24' is set apart with respect to carrier substrate 23.

Further variants are illustrated in FIGS. 3c and 3d. These examples differ relative to the two previous variants only in the spatial positioning of light source 24 and its electrical contacting. In this regard, light source 24 is disposed directly on carrier substrate 23 and is electroconductively contacted via contacting elements 24.1 indicated schematically. In FIG. 3c, reflector element 25 on the lower side of carrier substrate 23 takes the form of a diffractive grating structure. In FIG. 3d, reflector element 25' is in the form of a refractive optical element having the desired optical effect.

Therefore, in addition to its optical function, in the examples illustrated FIGS. 3c and 3d, carrier substrate 23 also takes over the positioning and contacting of light source 24. For a flip chip contacting of light source 24, both costly alignment work during assembly as well as the necessity for a separate light-source carrier substrate may be omitted.

Figure 4A:
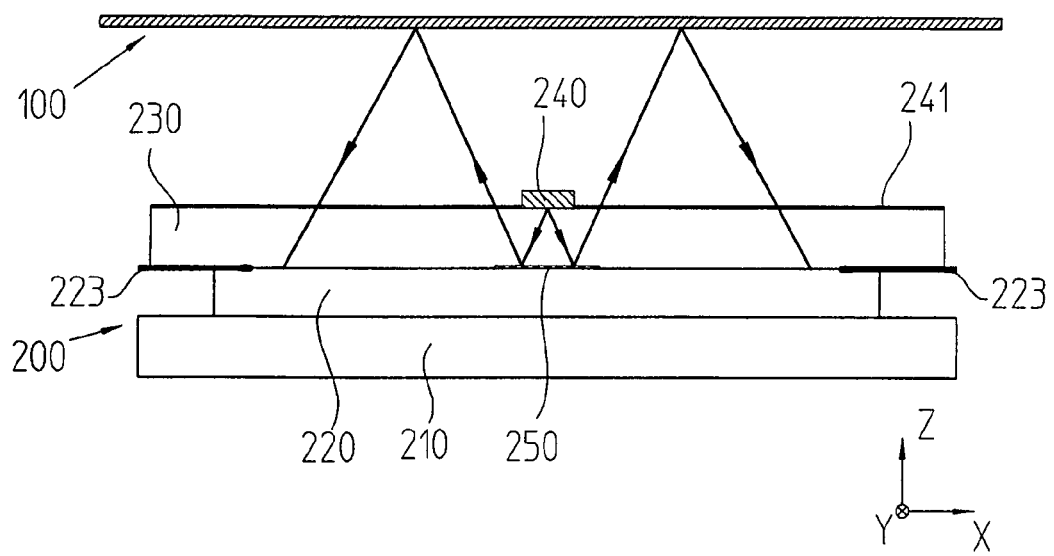
FIG. 4a is a schematic side view of a position-measuring device according to an example embodiment of the present invention.
Figure 4B:
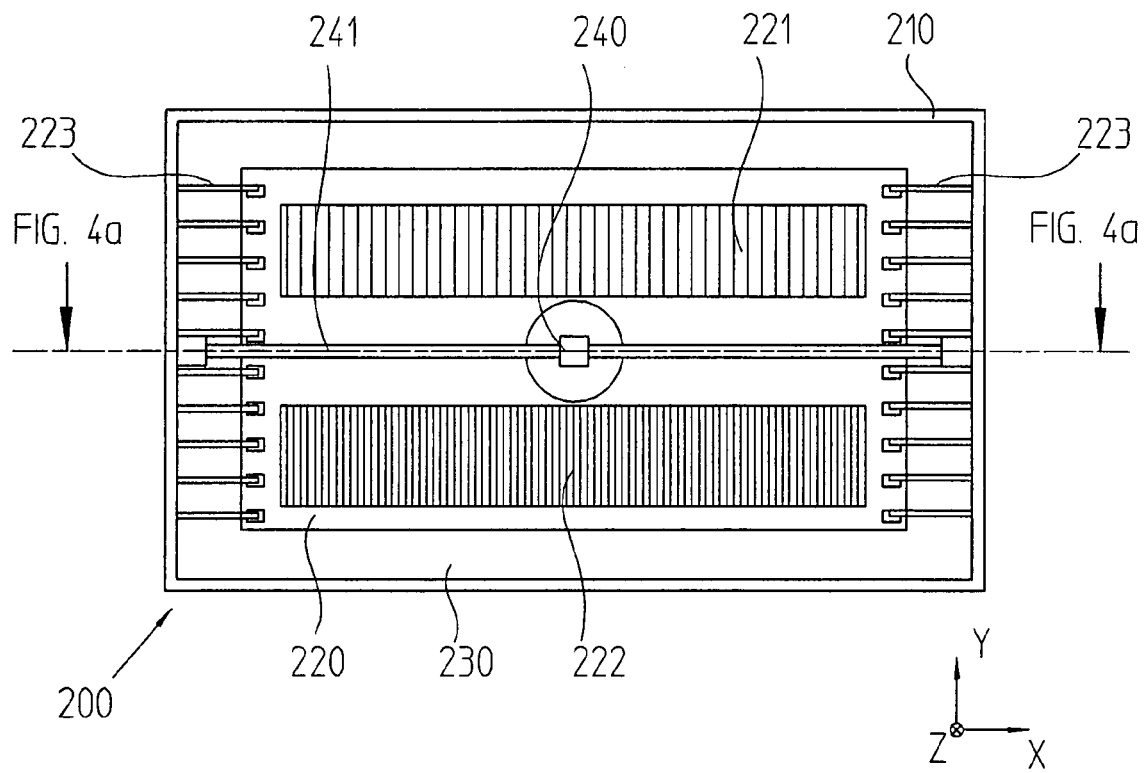

Another alternative of the position-measuring device is explained below with reference to FIGS. 4a and 4b. Analogous to the depiction in FIGS. 1a and 1b, FIGS. 4a and 4b illustrate a highly schematic sectional view with respect to the scanning beam path, as well as a top view of scanning unit 200. Only the significant differences with respect to the example illustrated in FIGS. 1a and 1b are described in the following.

Analogous to the example above, on the side of scanning unit 200, a support board 210 is provided, on which detector unit 220 having the two detector arrangements 221, 222 is placed. In contrast to the above-described arrangement, however, transparent carrier substrate 230 situated above it is formed over a markedly larger area, and mostly covers detector arrangements 221, 222, i.e., detector unit 220. An improved protection of detector unit 220 from mechanical damage may thereby be provided.

Different from the example above, in the present example embodiment, the electrical contacting, e.g., of detector arrangements 221, 222, is provided by carrier substrate 230. For the contacting of light source 240, similar to the example embodiment described above, a corresponding contacting conductor track 241 extends on the upper side of carrier substrate 230 and ends in the edge area of the carrier substrate in contact pads. On the other hand, in contrast to the example embodiment described above, detector arrangements 221, 222, e.g., the detector unit is electrically contacted via further contacting conductor tracks 223 on the lower side of carrier substrate 230 between carrier substrate 230 and detector unit 220. Therefore, in contrast to the example embodiment described above, no bonding wires are used for the contacting of detector arrangements 221, 222, but rather contacting conductor tracks 241, 223 arranged in planar fashion on the lower side of carrier substrate 230 are used. This permits the use of flip-chip contacting methods when manufacturing this sub-assembly.

Otherwise, the basic optical construction is identical to the example embodiment described above. For example, the optical functionality of reflector element 250 on the second side or lower side of carrier substrate 230 corresponds to that of FIGS. 1a and 1b.

Figure 5A:
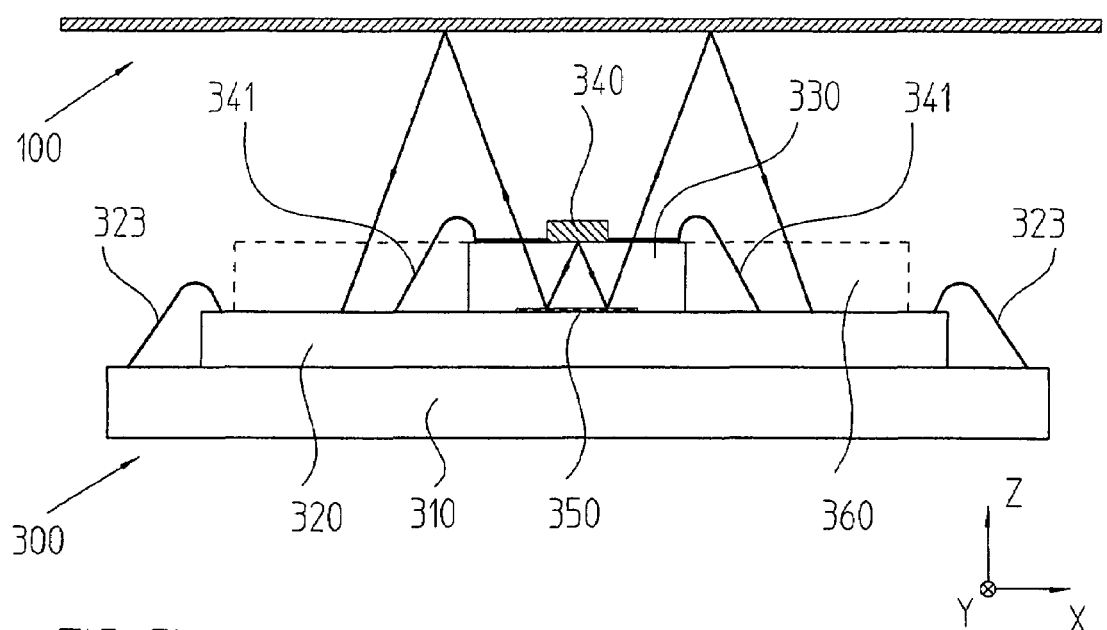
FIG. 5a is a schematic side view of a position-measuring device according to an example embodiment of the present invention.
Figure 5B:
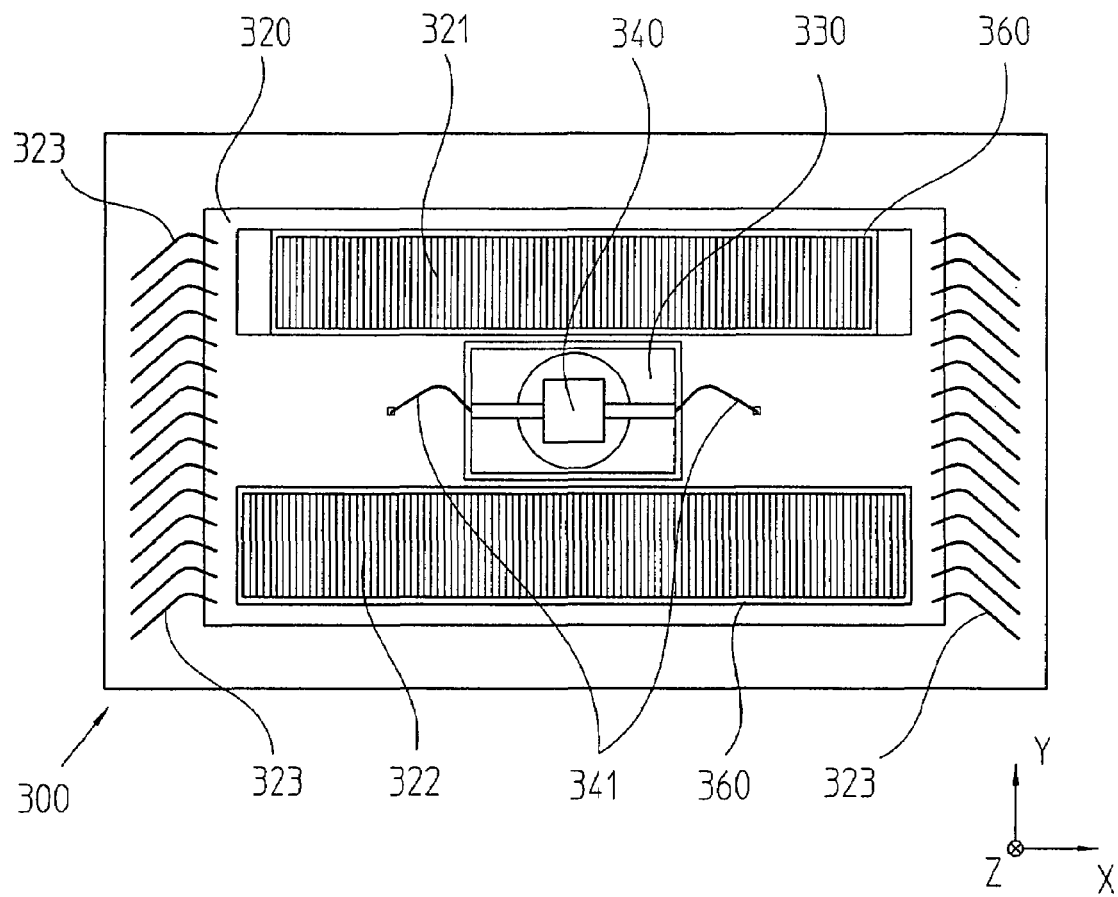

In the following, another variant of the position-measuring device is explained with reference to FIGS. 5a, 5b, 6a and 6b. In this context, FIGS. 5a and 5b illustrate a sectional view for clarifying the scanning beam path, as well as a top view of the scanning unit used. Certain geometric conditions of this variant are explained with reference to FIGS. 6a and 6b.

Because of the provision of a reflector element in the scanning beam path described with respect to the above-described variant, the location of the light source may be shifted virtually into the detection plane. For example, the desired independence of the incremental scanning from the scanning distance is therefore provided. However, situations with certain predefined geometric boundary conditions exist in which, despite of the use of a reflector element, the virtual luminous spot of the light source does not come to lie in the detection plane, but rather comes to lie before the detection plane. The variant of the position-measuring device described below offers a solution on the detection side in order to provide, by selective optical measures in the scanning beam path, that the virtual luminous spot of the light source, i.e., the virtual light source, comes to lie in the detection plane.

A position-measuring device suitable for addressing this issue is illustrated, in highly schematic fashion, in FIGS. 5a and 5b. This variant of the position-measuring device is based on the variant illustrated in FIGS. 1a and 1b. Only the measures provided in addition to the first-mentioned variant are described below.

To provide the position of the virtual light-source luminous spot in the detection plane, optical transmission elements 360 are disposed above detector arrangements 321, 322. Transmission elements 360 are arranged as plane-parallel glass plates having specific optical properties (thickness d, refractive index n) and in the example illustrated, completely cover respective detector arrangements 321, 322. The further construction of scanning unit 300 and of reflection measuring graduation 100 corresponds to that of FIGS. 1a and 1b.

Therefore, in this variant of the position-measuring device, in addition to the provision of reflector element 350 at the lower side of carrier substrate 330, optical transmission elements 360 are also disposed at least on detector arrangement 321 for generating the incremental signals, in order to provide the desired position of the virtual light source in the detection plane. It should be appreciated that these additional measures may be used even without the first-named measures in connection with the reflector element. That is, given certain geometric boundary conditions, it may be sufficient to resort only to these measures, and to dispense with the arrangement of the reflector element according to the first-described variant. In this instance, only suitably selected optical transmission elements could be disposed in the scanning beam path, for example, in the form of plane-parallel glass plates above the detector arrangements.

Figure 6B:
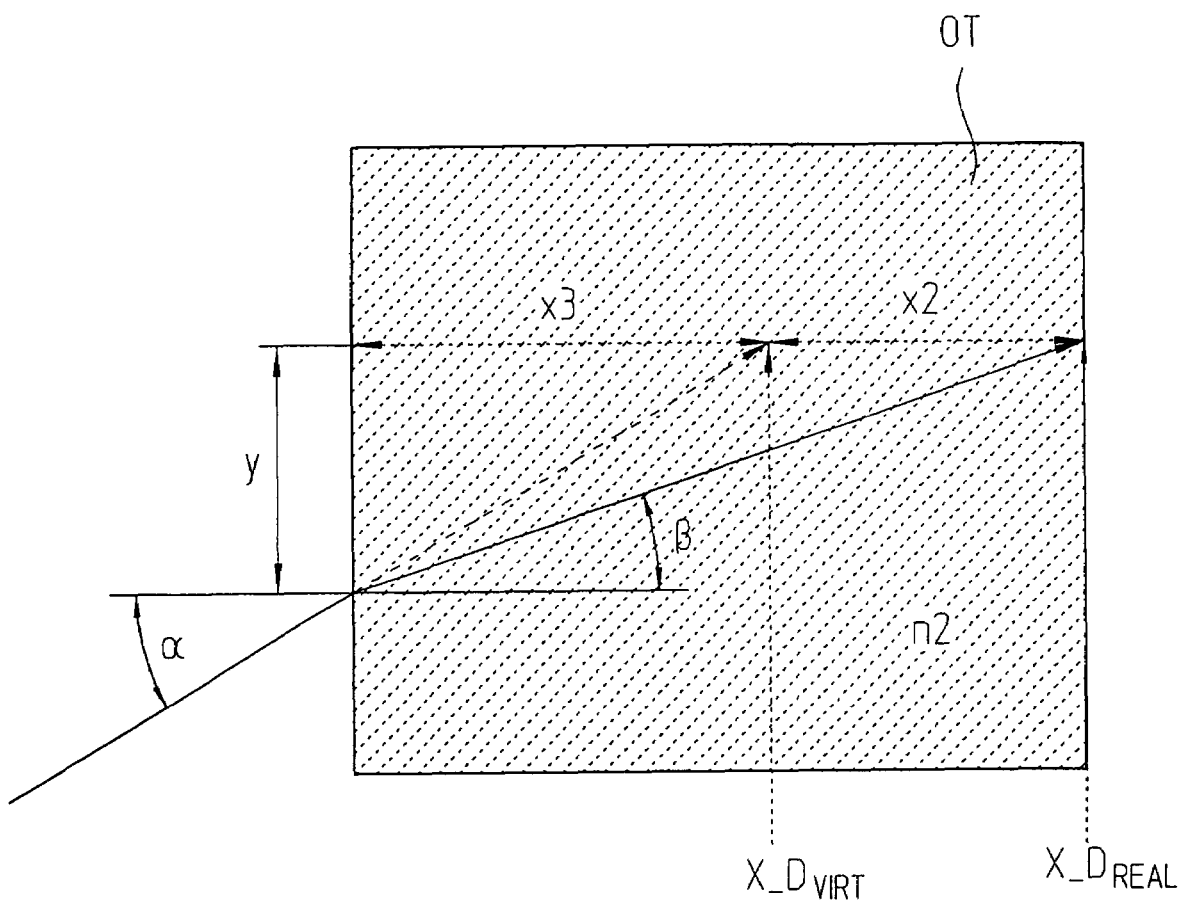

For a more detailed clarification of this variant and the optical effects additionally resulting on the scanning beam path due to the transmission elements, reference is made to FIGS. 6a and 6b. FIG. 6a illustrates, in schematic form, the unfolded scanning beam path including various relevant geometric variables. FIG. 6b illustrates a section from FIG. 6a.

In general, problems may result in such scanning configurations which require design approaches according to this variant when an unfavorable ratio exists between the illuminated area of the detector arrangement (large beam expansion) and the scanning distance. Thus, in this connection, it may occur that the virtual luminous spot of the light source does not come to lie in the detection plane, as desired, but rather before the detection plane.

This problem, as well as the measures according to this variant of the position-measuring device taken for addressing it, are be explained in greater detail with reference to FIGS. 6a and 6b.

First, the beam of rays emitted by the real (point) light source at location $x\_LQ_{REAL}$ in plane $LQ_{REAL}$ is suitably expanded via an expanding optics AO. Expanding optics AO may be implemented as an optical transmission element, e.g., as a lens, and has a thickness D and a refractive index n1. At the boundary surfaces of expanding optics AO, the depicted light beam of the emitted beam of rays experiences the desired optical effect in the form of a refraction upon entering and exiting, and leaves expanding optics AO (beam-expanded) at angle α as shown in FIG. 6a. As illustrated by the rearward extension of the transmitted output light beam indicated by a dashed line, position $x\_LQ_{VIRT}$ of the virtual luminous spot results as being located in expanding optics AO in plane $LQ_{VIRT}$. This plane is in the interior of expanding optics AO, displaced by the amount x1 relative to the entrance boundary surface.

Distance u represents the distance between measuring-graduation plane M and virtual light-source plane $LQ_{VIRT}$. Therefore, from the side of the measuring graduation, the virtual luminous spot appears at the angle α.

As mentioned above, the aim is for variables u and v to be identical, i.e., u=v. This means that the distance between virtual light-source plane $LQ_{VIRT}$ and measuring-graduation plane M is selected to be identical to the distance between measuring-graduation plane M and the detection plane.

Since the position-measuring device is intended to be designed as an incident-light system, the consequence of the requirement u=v is that the detection plane would therefore come to lie quasi within expanding optics AO. However, a real detector arrangement cannot be placed there.

Therefore, to address this problem, in this variant of the position-measuring device, it is provided to bring the detection plane virtually into the desired position, i.e., into virtual detection plane $D_{VIRT}$. The detector arrangement is really placed in a suitable real detection plane $D_{REAL}$. As illustrated in FIG. 6a, virtual detection plane $D_{VIRT}$ is situated away from real detection plane $D_{REAL}$ by the distance x2. In order to bring virtual detection plane $D_{VIRT}$ into the necessary position, an optical transmission element OT having thickness d and refractive index n2 is positioned in the scanning beam path, so that a defined optical effect on the scanning beam path results via the transmission element.

FIG. 6b illustrates the optical effect of transmission element OT in an enlarged view, e.g., the deflection effects thereby resulting for the transmitted beams of rays.

In the following, the optical effect of transmission element OT, as well as observations concerning its configuration are described in detail with reference to FIGS. 6a and 6b. In this connection, the aim is to bring virtual detection plane $D_{VIRT}$ into virtual light-source plane $L_{VIRT}$. Virtual light-source plane $L_{VIRT}$ is located away from the surface of the expanding optics by the distance x1. From this follows the requirement that x2>x1 must be selected if a real placement of the detector arrangement is intended to be implemented outside of expanding optics AO or transmission element OT.

As illustrated in FIG. 6b, the real beam path up to a detector arrangement outside of transmission element OT and the (dashed-line) beam path up to a virtual detector arrangement at position $x\_D_{VIRT}$ differ by consideration of the refraction resulting at the entrance boundary surface in the case of the real beam path. As illustrated, this is not taken into account in the case of the virtual beam path.

Basically, for the real beam path at the entrance boundary surface, it holds that $$\sin \alpha = n2 * \sin \beta, \quad \text{(Eq. 3.1)}$$

Moreover, the following geometric relationships apply for the situation illustrated in FIG. 6b:

$$\tan \alpha = y/x3 \quad \text{(Eq. 3.2)}$$

$$\tan \beta = y/(x3+x2) \quad \text{(Eq. 3.3)}$$

From this, it follows that:

$$x3 = x2 * \tan \beta / (\tan \alpha - \tan \beta) \quad \text{(Eq. 3.4)}$$

Therefore, taking into account the requirement x2>x1 mentioned above, the following results as the minimum condition for the selection of variable d, i.e., the thickness of transmission element OT:

$$\begin{aligned} d &= x2 + x3 \\ &= x1 * (1 + \tan\beta / (\tan\alpha - \tan\beta)) \end{aligned} \quad \text{(Eq. 3.5)}$$

Thus, by a suitable selection of thickness d of transmission element OT in the scanning beam path, it is possible to adjust the position of the virtual detection plane as desired, in order to provide the advantages aimed for during the scanning.

As illustrated in FIGS. 5a and 5b, appropriately dimensioned optical transmission elements having suitable thicknesses d are implemented as plane-parallel glass plates that are disposed above the (real) detector arrangements.

Moreover, in this variant of the position-measuring device, the optical transmission elements may also be provided with further optically effective structures such as, for instance, grating structures or lens structures, in order to correct imaging errors possibly resulting. Further, by such elements, it is possible to provide that light falls only perpendicularly onto the detector arrangement, and therefore an unwanted crosstalk between adjacent detector elements as a result of non-normal incident light may be avoided.

In addition to the variants and exemplary embodiments described above, there are still further alternative and additional possibilities within the scope hereof.

For example, it is possible to completely surround the light source, in each case placed on the upper side of the carrier substrate, with a suitable sealing compound and thereby to reliably protect the light source from possible damage during operation.

In addition to the reflector element, further optically effective partial areas may be formed on the upper and lower sides of the carrier substrate, in order to influence the scanning beam path if necessary. They may be further diffractive structures or gratings, or further refractive structures or reflectors. For example, they are all disposed or formed only on one side, e.g., the lower side of the carrier substrate.

When, according to the exemplary embodiment illustrated in FIGS. 4a and 4b, the carrier substrate is electrically connected to the detector unit via a flip-chip contacting, a suitable filling material, i.e., a so-called underfiller, may be disposed in the intervening space, which protects the optically effective structures in the carrier substrate formed on the lower side, etc.

What is claimed is:

1. A position-measuring device, comprising:
   a reflection measuring graduation; and
   a scanning unit, the scanning unit and the reflection measuring graduation movable relative to each other in at least one measuring direction, the scanning unit including:
   a light source;
   a detector arrangement in a detection plane; and
   at least one reflector element arranged in a scanning beam path, the reflector element configured to have an optical effect on the scanning beam path so that a distance between a virtual light source and the reflection measuring graduation and a distance between the reflection measuring graduation and the detection plane are equal so that the light source is placed virtually in the detection plane.

2. The position-measuring device according to claim 1, wherein the reflector element is positioned between the light source and the reflection measuring graduation.

3. The position-measuring device according to claim 1, wherein the reflector element is arranged as a refractive optical element.

4. The position-measuring device according to claim 1, wherein the reflector element is arranged as a diffractive optical element.

5. The position-measuring device according to claim 1, wherein the scanning unit includes a transparent carrier substrate, the light source located on a first side of the carrier substrate facing the reflection measuring graduation, the reflector element located on a second side of the carrier substrate facing away from the reflection measuring graduation.

6. The position-measuring device according to claim 5, wherein a radiation-emitting area of the light source is disposed in a direction of the first side of the carrier substrate, the light source configured to emit radiation in a direction of the second side of the carrier substrate.

7. The position-measuring device according to claim 5, wherein the reflector element is arranged as an optical component integrated into the second side of the carrier substrate.

8. The position-measuring device according to claim 5, wherein the carrier substrate is positioned above a detector unit having at least one detector arrangement, the detector unit arranged on a support board in the scanning unit.

9. The position-measuring device according to claim 8, wherein the carrier substrate has a smaller area than the detector unit and is arranged in a central partial area of the detector unit without the detector arrangements being completely covered, the detector unit, in regions not covered by the carrier substrate, electroconductively connected via bonding wires to conductor tracks in the support board.

10. The position-measuring device according to claim 9, wherein the light source on the carrier substrate is electroconductively connected via bonding wires to conductor tracks in the detector unit.

11. The position-measuring device according to claim 8, wherein the carrier substrate partially covers the at least one detector arrangement on the detector unit, contacting conductor tracks arranged between the second side of the carrier substrate and the detector arrangement for electrical contact of the detector arrangement.

12. The position-measuring device according to claim 11, wherein the light source on the carrier substrate is electroconductively connected via contacting conductor tracks on the carrier substrate to conductor tracks in the detector unit.

13. The position-measuring device according to claim 1, wherein the light source is arranged as a point light source.

14. The position-measuring device according to claim 1, wherein the scanning unit includes at least two detector arrangements, a first detector arrangement configured to detect a displacement-dependent incremental signal, a second detector arrangement configured to detect an absolute-position signal.

15. The position-measuring device according to claim 1, wherein the detector arrangement is arranged as a detector array including individual detector elements disposed adjacent to one another in the measuring direction.

16. A position-measuring device, comprising:
    a reflection measuring graduation; and
    a scanning unit, the scanning unit and the reflection measuring graduation movable relative each other in at least one measuring direction, the scanning unit including:
    a light source;
    a detector arrangement in a detection plane; and
    at least one optical transmission element arranged in a scanning beam path, the optical transmission element configured to have an optical effect on the scanning beam path so that a distance between the light source and the reflection measuring graduation and a distance between the reflection measuring graduation and a detector arrangement in a virtual detection plane are equal, so that, for relative movement between the scanning unit and the reflection measuring graduation, a fringe pattern, modulated as a function of the movement, results in the virtual detection plane.

17. The position-measuring device according to claim 16, wherein the optical transmission element is arranged between the reflection measuring graduation and the detector arrangement in the scanning beam path.

18. The position-measuring device according to claim 16, wherein the optical transmission element is arranged as a refractive optical element.

19. The position-measuring device according to claim 18, wherein the optical transmission element is arranged as a plane-parallel glass plate having a defined thickness.

20. The position-measuring device according to claim 16, wherein the scanning unit includes a support board on which a detector unit having at least one detector arrangement is arranged, the optical transmission element arranged above the detector arrangement.

21. The position-measuring device according to claim 16, wherein the optical transmission element includes optical elements to provide that light falls only perpendicularly onto the detector arrangement.

22. The position-measuring device according to claim 16, wherein the light source is arranged as a point light source.

23. The position-measuring device according to claim 16, wherein the scanning unit includes at least two detector arrangements, a first detector arrangement configured to detect a displacement-dependent incremental signal, a second detector arrangement configured to detect an absolute-position signal.

24. The position-measuring device according to claim 16, wherein the detector arrangement is arranged as a detector array including individual detector elements disposed adjacent to one another in the measuring direction.

25. A position-measuring device, comprising:
    a reflection measuring graduation; and a scanning unit, the scanning unit and the reflection measuring graduation movable relative to each other in at least one measuring direction, the scanning unit including:
a light source;
a detector arrangement in a detection plane; and one of:
(a) at least one reflector element arranged in a scanning beam path, the reflector element configured to have an optical effect on the scanning beam path so that a distance between a virtual light source and the reflection measuring graduation and a distance between the reflection measuring graduation and the detection plane are equal so that the light source is placed virtually in the detection plane; and (b) at least one optical transmission element arranged in the scanning beam path, the optical transmission element configured to have an optical effect on the scanning beam path so that a distance between the light source and the reflection measuring graduation and a distance between the reflection measuring graduation and a detector arrangement in a virtual detection plane are equal, so that, for relative movement between the scanning unit and the reflection measuring graduation, a fringe pattern, modulated as a function of the movement, results in the virtual detection plane.

* * * * *